Figure 1A:
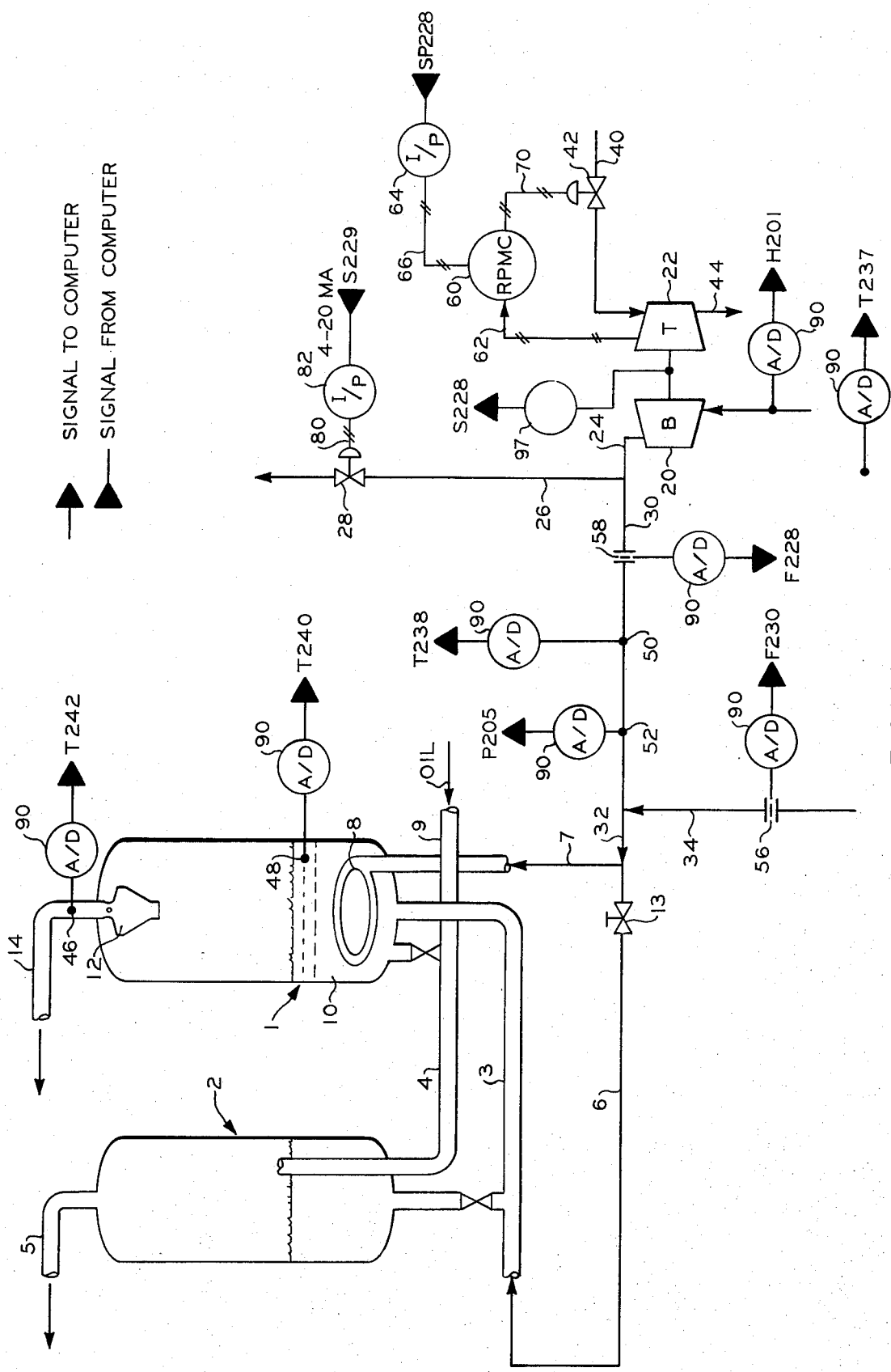

United States Patent [19]

Christie

[11] 4,217,243
[45] Aug. 12, 1980

[54] CATALYST REGENERATOR CONTROL

[75] Inventor: David A. Christie, Bartlesville, Okla.

[73] Assignee: Phillips Petroleum Company, Bartlesville, Okla.

[21] Appl. No.: 681,979

[22] Filed: Apr. 30, 1976

[51] Int. Cl.² ............... B01J 29/38; B01J 21/20; C10G 11/18; C10G 11/04
[52] U.S. Cl. ............... 252/419; 208/DIG. 1; 208/164; 252/417; 364/500; 364/503
[58] Field of Search ............... 252/419, 417; 208/159, 208/164, DIG. 1; 235/151.12; 364/500, 503

[56] References Cited

U.S. PATENT DOCUMENTS

| | | | |
|---|---|---|---|
| 2,942,866 | 6/1960 | Anderson | 266/30 |
| 2,963,422 | 12/1960 | Hann | 208/160 |
| 3,004,926 | 10/1961 | Goering | 252/417 |
| 3,161,583 | 12/1964 | Pohlenz | 208/164 |
| 3,166,381 | 1/1965 | Loss | 252/419 |
| 3,175,968 | 3/1965 | Berger | 208/164 |
| 3,261,777 | 7/1966 | Iscol | 208/113 |
| 3,380,650 | 4/1968 | Drummond | 230/114 |
| 3,410,793 | 11/1968 | Stranahan et al. | 208/159 |
| 3,412,014 | 11/1968 | Mattix et al. | 208/164 |
| 3,513,087 | 5/1970 | Smith | 208/159 |
| 3,591,783 | 7/1971 | Zumwalt | 235/151.12 |
| 3,828,171 | 8/1974 | Griffin | 235/151.12 |
| 3,891,344 | 6/1975 | Braytenbah | 415/1 |

Primary Examiner—P. E. Konopka

[57] ABSTRACT

The flow of air into a catalyst regenerator is automatically controlled by controlling a side air stream responsive to a computed desired total air flow signal and by controlling a main air stream at a constant value. This constant value is changed if two conditions simultaneously occur: The time elapsed since the last change of said constant value is not shorter than a given minimal value, and the control of the side air stream exceeds the limit of the side air controller.

12 Claims, 6 Drawing Figures

CATALYST REGENERATOR CONTROL

This invention relates to catalytic cracking of hydrocarbons. In one of its aspects, the invention relates to the regeneration of spent cracking catalyst. Another more specific aspect of this invention is the automatic control of a catalyst regenerator.

BACKGROUND OF THE INVENTION

Hydrocarbons are cracked into light fractions by contacting them under elevated temperature conditions with a cracking catalyst. During this cracking process, a certain amount of coke is deposited on the cracking catalyst particles. This coke buildup reduces the activity of the catalyst. The spent catalyst is regenerated by removing the hydrocarbons from the spent catalyst and contacting it under elevated temperature conditions with a free oxygen-containing gas, which will be called air in the following for simplicity. This gas can, however, be any free oxygen-containing gas. By this procedure the coke and the air react so that coke is burned off from the catalyst particles. The thus regenerated catalyst particles are returned to the cracking step.

The control of the regenerator is a very difficult problem since the combustion of the coke is influenced by several process parameters, some of which are uncontrollable. Typically, the catalyst regenerators are controlled by controlling the flow of air into the regenerator responsive to a temperature measurement within the regenerator.

Several difficulties occur in such temperature control systems due to the fact that the air sources are usually turbocompressors, that the air flow rate has to be changed often and accurately for good temperature control, which is difficult if not impossible with the turbocompressors, and that the air flow signals are usually very noisy. It would, therefore, be desirable to have a more accurate system available for controlling the air flow to a regenerator, as blowers such as turbocompressors are being used as an air source because of their higher efficiency.

THE INVENTION

It is, therefore, one object of this invention to provide a process for regenerating cracking catalysts comprising a new control method.

Another object of this invention is to provide a catalyst regeneration process which automatically controls the air flow into the regenerator responsive to temperature measurements in the regenerator.

A further object of this invention is to provide a catalyst regenerator control system in which the air flow to the regenerator can be controlled accurately and quickly, although blowers are used for an air source.

Figure 1B:
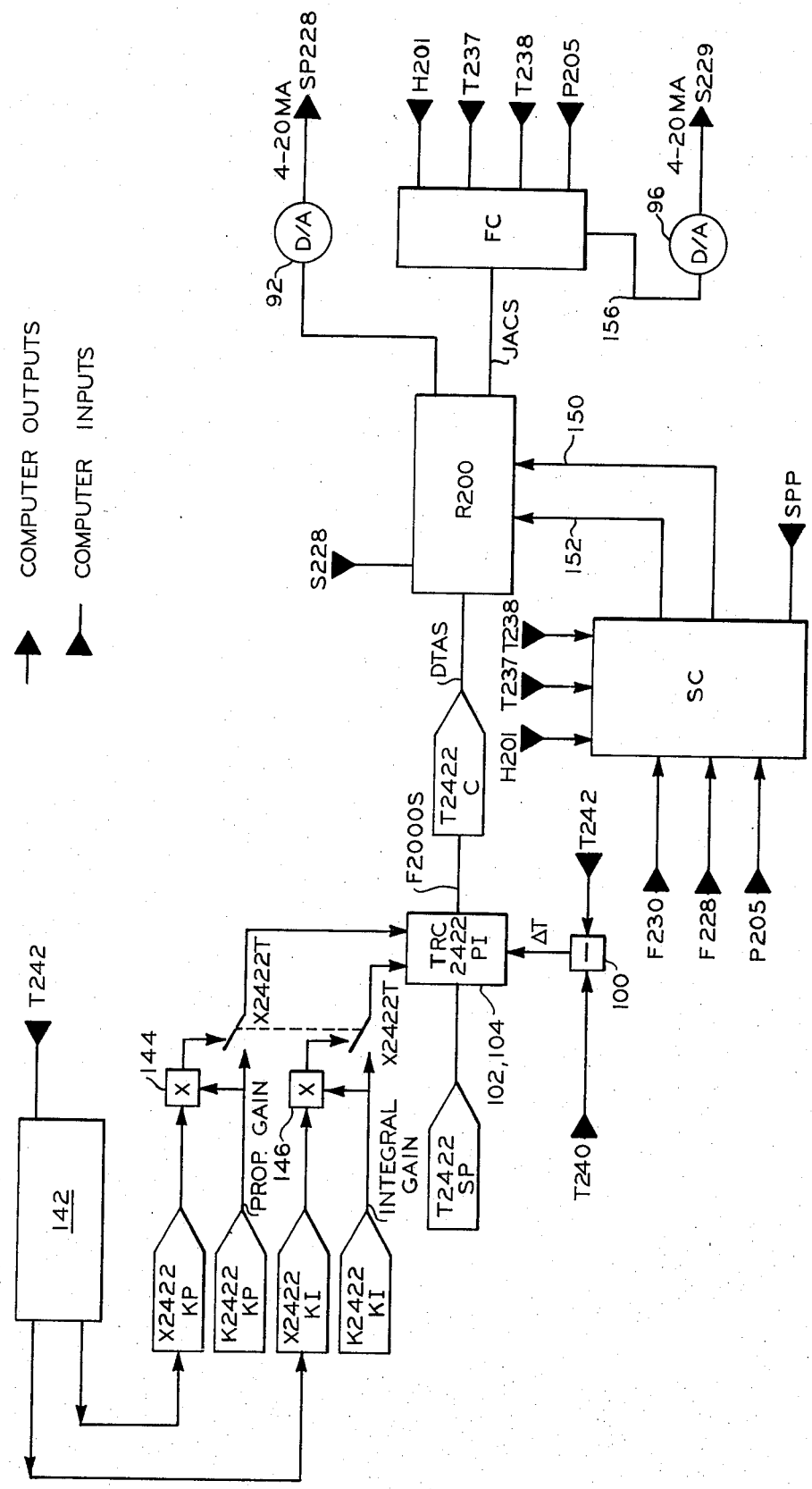
Figure 1C:
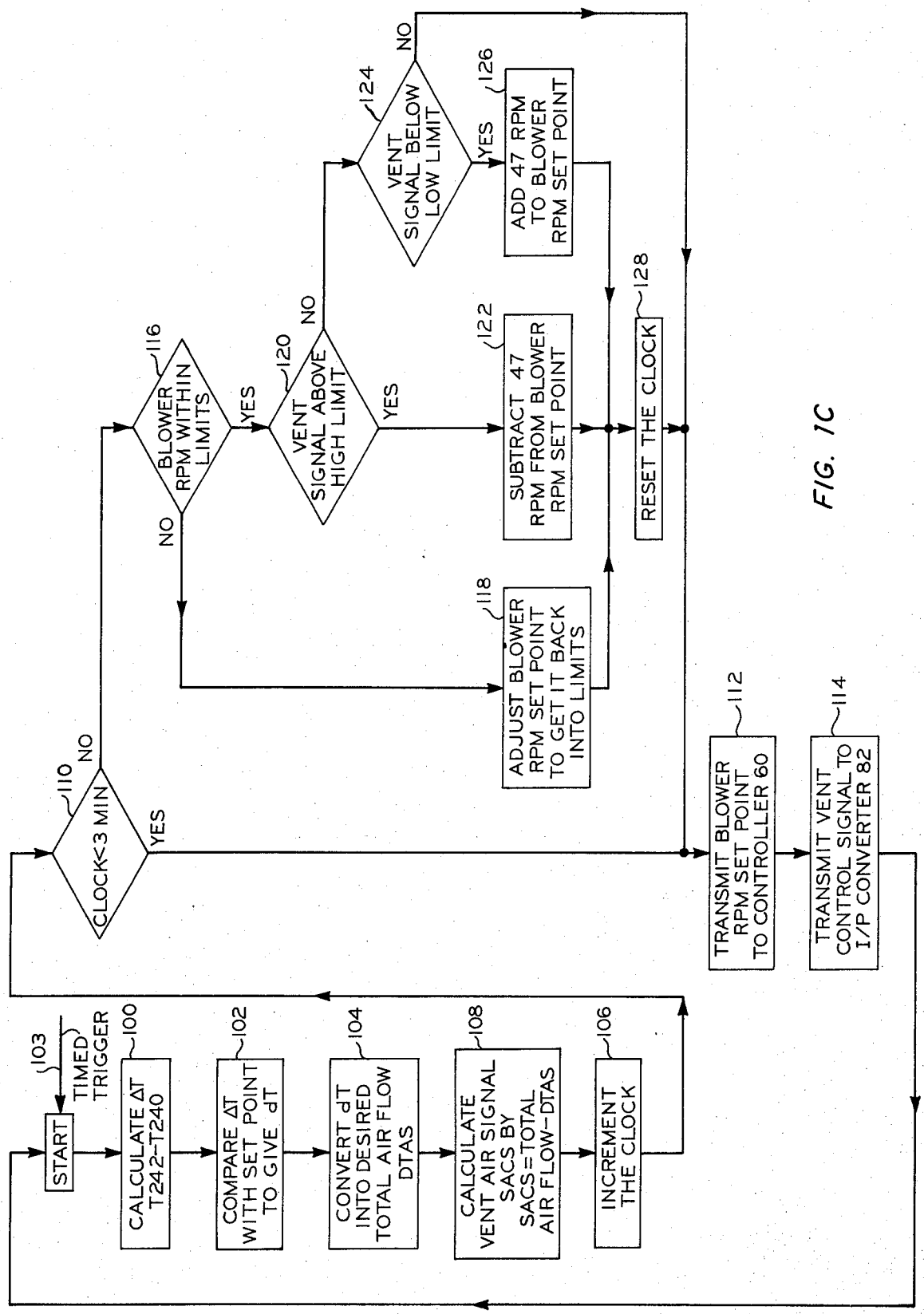
Figure 2A:
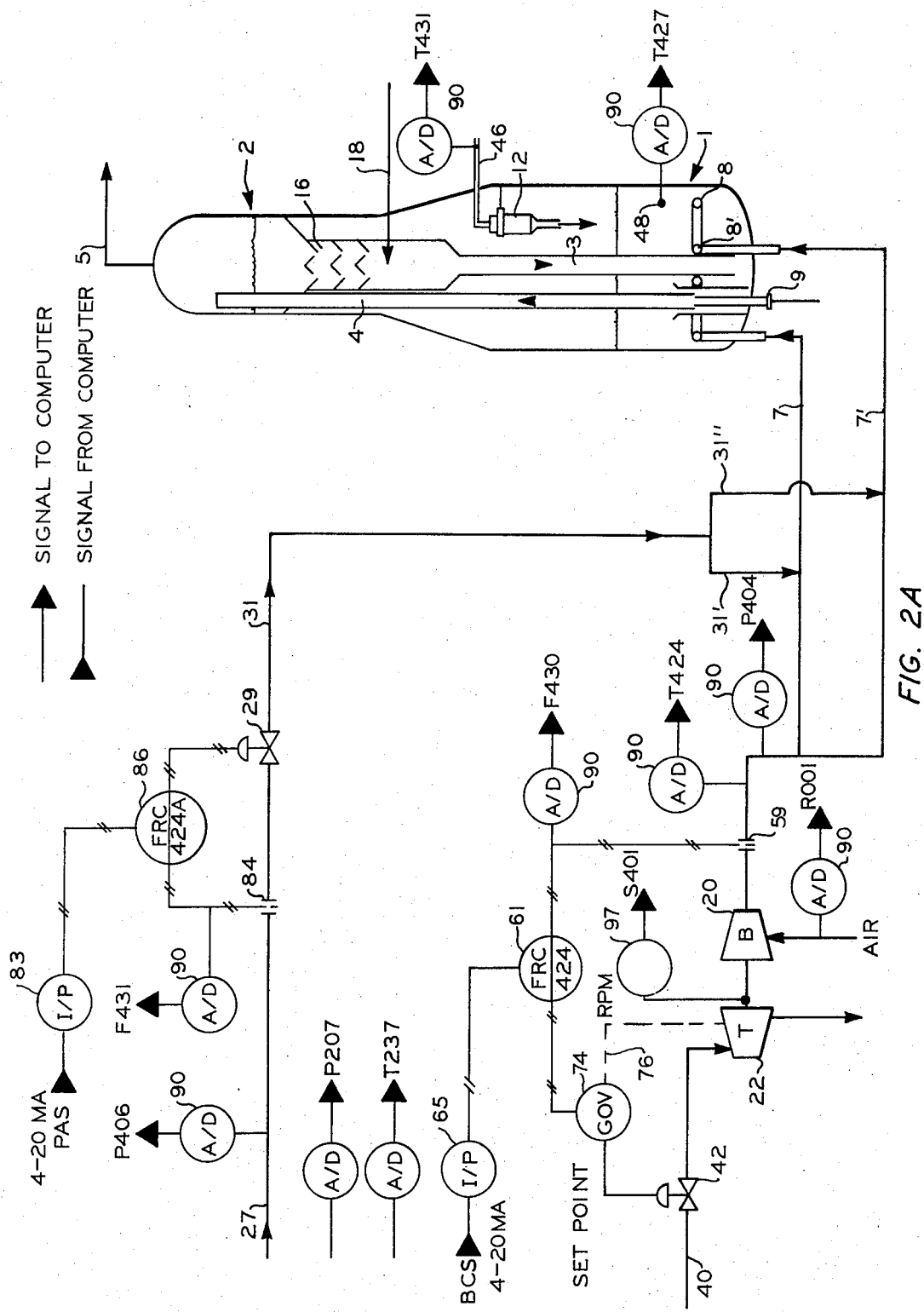
Figure 2B:
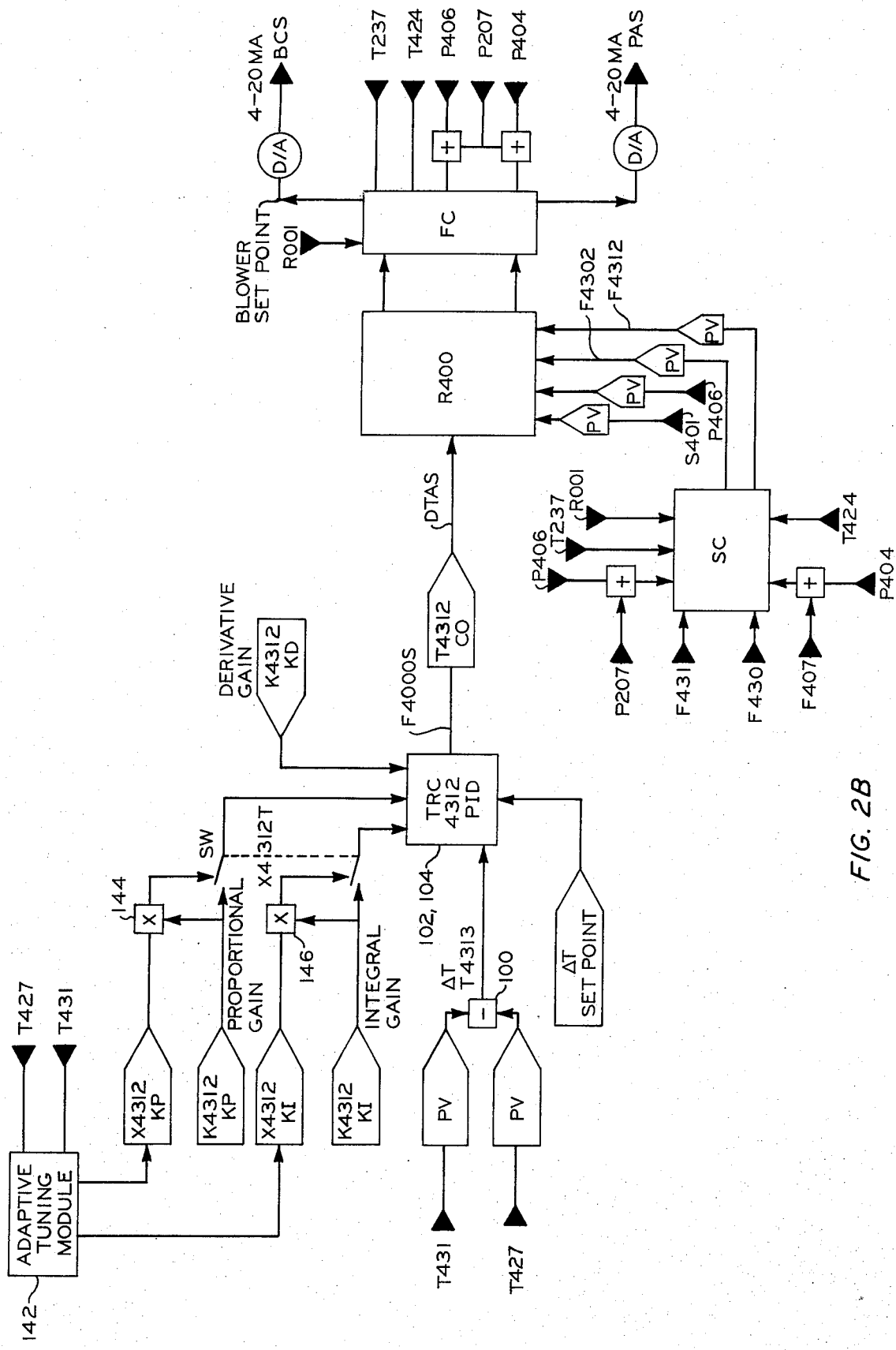

These and other objects, details, features, advantages and embodiments of this invention will become apparent to those skilled in the art from the following detailed description of the invention, the appended claims and the drawing, of which FIGS. 1A and 2A show a diagrammatic view of a cracker-regenerator unit, together with the computer inputs and outputs, FIGS. 1B and 2B show a schematic flow diagram of the computer control with the same inputs and outputs as shown in FIGS. 1A and 2A, and FIGS. 1C and 2C show a logical flow sheet for a computer program for the control of the air flow shown in the other figures.

In accordance with this invention, a cracking catalyst regeneration process is provided in which the flow of air to the regenerator is controlled in a unique manner. Two air flows, namely one in a sideline and one from a blower, are controlled. The blower air supply is controlled at a constant value setpoint as long as the limits of the side air control are not exceeded. The side air line is controlled responsive to the difference of a desired computed total air flow signal and the measured main air flow. When and if one of the limits of the side air flow control is exceeded, the constant value setpoint of the blower air flow is changed by an increment when and if the further condition is fulfilled that the time elapsed since the last change of this constant value set point is not shorter than a fixed minimal elapsed time. This fixed minimal elapsed time is usually within the range of about 30 to about 500 seconds.

More specifically the method for regenerating the coke-laden catalyst comprises introducing coke-deactivated cracking catalyst from a cracking zone into a regeneration zone, injecting air into contact with that cracking catalyst in the regeneration zone, burning off at least a portion of this coke from the catalyst with the air, withdrawing flue gas and regenerated catalyst from the regeneration zone, responsive to at least one temperature measurement in the regenerator controlling the flow of air into the regenerator. The control system of this invention comprises automatically generating a desired total air flow signal DTAS, automatically generating a blower air control signal BACS, having a constant value set either at the beginning of the control process to a desired value, or by the previous control cycle, passing this blower air control signal BACS to a blower air controller that controls the blower speed responsive to the blower air control signal BACS, automatically measuring the flow air in a main air flow line into which the blower feeds air and establishing a main air flow signal MAFS, automatically establishing a side air control signal SACS from said desired total air flow signal DTAS, and the main air flow signal MAFS in accordance with the relationship $$SACS = DTAS - MAFS,$$

passing the side air control signal to a side air controller that controls the flow of the side air responsive to this side air control signal between two extremes, automatically establishing a time signal containing the information whether or not the elapsed time is shorter than a fixed minimal time being in the range of about 40 to about 500 seconds, the elapsed time being defined as the time that has elapsed since the setting of the constant value for the blower as presently used, automatically switching to one of the following three procedures responsive to the side air control signal SACS and the time signal, namely (aa) when the side air control signal is within two set limits of the side air controller: repeating the previous steps, (bb) when the side air control signal exceeds one of these limits of the side air controller and when the time signal mentioned indicates that the elapsed time is shorter than the fixed minimal elapsed time: also repeating the previous steps, (cc) when the side air control signal SACS exceeds one of the limits of the side air controller and when said time signal indicates the elapsed time not to be shorter than the fixed minimal elapsed time: automatically changing the constant value for the blower air controller to a new constant value by an increment representative of and smaller than the quantity of air that can be controlled by the side air controller and repeating the control steps mentioned with the new constant value as said constant value for the blower control. For the following control cycle, this last mentioned alternative (cc) starts a new measurement of the elapsed time. The two limits of the side air control signal are not necessarily the upper and lower extreme of the side air controller. Rather the upper limit is usually lower than the upper extreme of the side air control signal the side air controller can respond to, and the lower limit is higher than the lower extreme of the side air control can respond to. The control procedure under (bb) above is such that the side air controller is operated within the operational extremes. The air flow signals are added or subtracted after have been computed to the same pressure and temperature conditions. Preferably the air flow signals are reduced to normal conditions and then used for further computation with each other.

The preferred way of establishing the time signal mentioned is to use an increment clock within a digital computer. This icrement clock basically is set to a fixed value of, e.g., 45 at the beginning of the time "measurement" and during every control step "1" is subtracted from this "45". Therefore, if the control cycle takes 4 seconds, the clock will change its output from, say 0 to 1 after 3 minutes have elapsed since it has been set. It is, however, within the scope of this invention to use an external clock for the purpose of establishing the elapsed time signal.

The side air line preferably is a valve-controlled air flow conduit. Depending upon the specific plant conditions given, this side air line can be a vent line. Under other conditions this side air line can be a valve-controlled trim air line in which plant air, generally under a constant pressure, is utilized and injected into the regenerator in addition to the main air flow generated by the blower. In case a trim air flow is being used, the blower set point is changed to a value of higher air flow in case the side air control signal exceeds the upper limit and vice versa. Correspondingly and inversely, the blower setpoint is changed to decrease the amount of blower air in case a vent air line is being used and the control signal for the vent air line exceeds the upper limit thereof and vice versa. Generally the point at which the switching of the blower setpoint is carried out is not the actual limit of the side air controller. Rather the control system is set such that the blower setpoint is changed whenever the side air controller falls below 10% of the total control range or exceeds 90% of the control range. For the purposes of this invention in the following, only the words "upper limit" and "lower limit" are being used with the understanding that this means the extreme values actually used for the switching operation, not necessarily the absolute extremes of the side air controller.

In another preferred embodiment of this invention, the air blower is driven by a steam turbine. In this embodiment the flow of steam to the turbine is controlled. This control preferably is done responsive to an RPM (rotations per minute) signal indicating the RPM of the turbine. The control is such as to keep the turbine at a constant RPM and to change the setpoint for this RPM only if at least the fixed minimal elapsed time mentioned above has elapsed since the last change of the turbine RPM has taken place.

The blower air control signal BACS is preferably changed in such increments that the actual change of blower air achieved by the incremental change of the setpoint of the blower corresponds to about ½ of the total air change that is achievable by the side air controller between the actual extremes thereof. In other words the increment by which the blower air control signal is switched corresponds to a flow change in blower air which equals about 50% of the total side air controlled by the side air controller.

Advantageously the main air flow signal is freed of noise before this signal is used for establishing the side air control signal. This advantageously can be done because changes in air flow necessitated by the main air flow signal occur very slowly as compared to the noise signal. Therefore, the noise of the main air flow signal can readily be removed by filtering all those components of the main air flow signal that have a frequency above about one cycle per second.

The presently preferred method of controlling the air flow is by measuring the temperature of the dense phase in the regenerator and the temperature of the flue gas leaving the regenerator. A temperature difference signal is established by subtracting the dense phase temperature from the flue gas temperature. This temperature difference obtained is converted into a desired total air flow signal by comparing it with a temperature difference setpoint. The desired total air flow is calculated for standard conditions of temperature and pressure. The main air flow signal measured is corrected to standard conditions. The difference between the two signals corresponds to the side air control signal under standard conditions. This signal is then reconverted to flow conditions for the actual control of the side air flow.

For a still better understanding of the invention, reference is now made to the attached drawing showing two embodiments of the regenerator control.

Cracker Regenerator Control FIGS. 1A, B and C

FIG. 1A schematically shows a diagram of a cracker regenerator system with the air supply and the output signals and input signals for the computer. In a regenerator 1, coke is burned off from catalyst that is introduced from a reactor 2 via line 3. Regenerated catalyst is contacted with oil from line 9 in pipe 4 and the resulting mixture consisting essentially of cracked oil and catalyst is introduced into the reactor 2. Actually, the cracking reaction is practically complete when the mixture leaves the pipe 4 so that "reactor 2" is rather a separator where hydrocarbons are stripped off (not shown in FIG. 1A) from the catalyst before the catalyst is introduced into the regenerator 1. The cracked hydrocarbon product is removed from reactor 2 overhead via line for further processing, e.g., in fractionators.

The catalyst is moved through line 3 by riser air introduced via line 6. The main air flow is introduced into the regenerator via line 7 and a dispersal ring 8.

Coke on the catalyst is removed by partial combustion in regenerator bed 10, which is catalyst bed fluidized by the air and combustion gases. An after-burning occurs in the upper portion of the regenerator 1. The gases leaving the regenerator bed 10 are passed through one or more cyclones 12 in order to remove entrained catalyst particles which fall back into the regenerator bed 10 from the cycline 12. Flue gas leaves the regenerator 1 via line 14.

The air for the regenerator 1 is provided by a compressor 20, which in turn is driven by a steam turbine 22. Compressed air leaves the compressor 20 via line 24. A portion of this compressed air is passed to vent via line 26 and vent control valve 28. The remainder of the compressed air is passed via line 30 to the main air line 32. A spill air flow is added via line 34 to the main air line 32, which feeds air both via lines 6 and 7 to the regenerator. The portion of the total air in lines 6 and 7 is controlled by valve 13.

The steam turbine 22 is operated with steam from line 40, the flow of which is controlled by a steam control valve 42. Low-pressure steam leaves the steam turbine 22 via line 44.

Control System

The control system involves measuring several process variables and responsive thereto, controlling other process variables. The measured variables and their abbreviations in the drawing, as well as the controlled variables and their abbreviations in the drawing, are listed in the following.

Measured Process Variables a. T242: temperature of the flue gas.
b. T240: temperature of the regenerator bed 10.
c. F228: flow of air in line 30; this is the blower air less the vent air in line 26.
d. F230: flow of spillover air; this flow value plus the flow value F228 is the total air actually introduced into the regenerator.
e. P205: pressure of air in line 30.
f. T238: temperature of air in line 30 (blower air temperature).
g. T237: ambient air temperature; schematically indicated in FIG. 1A.
h. H201: ambient humidity.
i. S228: actual RPM of the steam turbine.
j. Elapsed time. This is the time elasped since the last adjustment of the blower setpoint had been made. This measuring of the elapsed time is carried out directly in the computer by incrementing a clock for every control cycle until the elapsed time is no longer less than the fixed minimal elapsed time, which in the present case is 3 minutes. The incrementing of the time clock is shown as step 106 in FIG. 1C. Instead of using a time clock inside of the computer, it is also possible to use a separate time clock outside of the computer.

The four temperature signals T237, T238, T240 and T242 are obtained from thermocouples that are commercially available from The Foxboro Company, Foxboro, Massachusetts, and are the "Pyod" type thermocouples. These thermocouples are connected to a uniform thermocouple reference available as Optrol ® Model 320 by Applied Automation, Inc., Bartlesville, Oklahoma.

The air flow signal F228 is obtained from a venturi flow meter 58 and a pressure-to-current converter (P/I) commercially available from The Foxboro Corporation. The spillover air flow signal F230 is obtained from an orifice meter 56, a P/I cell commercially available as Foxboro E92-RN02I from The Foxboro Company. The pressure signal P205 is obtained from a commercially available pressure meter 52. The relative humidity signal H201 is obtained at the blower air inlet from a commercially available instrument (Thunder Scientific Relative Humidity Sensor) manufactured by Thunder Scientific Corp., Albuquerque, New Mexico.

The RPM signal S228 is obtained from a magnetic pick-up sensing the teeth on a gear on the turbine shaft. In the computer the pulses from the magnet pick-up are converted in unit 97 into a digital signal S228 representative of the actual RPM of the turbine 22.

Controlled Process Variables:

a. S229: An analog electrical signal calculated by the computer as will be explained in detail below. This signal generally changes frequently and oftentimes is changed from every control cycle to the next. The signal corresponds to the difference between the desired total air flow and the actual air flow in line 32. The signal is such that a positive value of this difference will result in a further closing of valve 28, whereas a negative value of this difference will result in a further opening of this valve 28, which is the vent valve. The electrical signal is converted in an I/P converter commercially available from Taylor Instruments, Model 701TS-112, to an air signal that actuates the valve via line 80.

b. SP228: This is an electrical analog signal being used as the setpoint for the RPM controller 60. This RPM controller 60 is an air controller with two inputs. To the input for the measured value, the air signal corresponding to the actual RPM (rotations per minute) of the turbine 22 is forwarded via line 62. This signal is obtained from the turbine. To the setpoint input of the pneumatic controller 60, the analog signal from the I/P converter 64 (commercially available from Taylor Instruments, Model 701TS-112) is forwarded via line 66. The output of the RPM controller 60 actuates the steam valve 42 via line 70 until the actual RPM of the turbine 22 is the same as the setpoint RPM. It is important to note that the signal SP228 normally is constant. It is only changed under two conditions which have to occur simultaneously: the signal S229 exceeds one of the set limits that can be handled by the hydraulic valve 28 and the time elasped since the last change of the setpoint for the blower is not shorter than a fixed minimal elasped time. This minimal elasped time in the present case is 3 minutes. Generally, this fixed time signal will be in the range of about 30 to about 500 seconds.

All the electrical analog signals that are measured and listed above under (a) to (h) are multiplexed and sent to an analog memory input system that has incorporated an analog-to-digital converter and can handle up to 64 analog inputs. This analog memory input system is manufactured by Applied Automation, Inc., under the designation Model 313 AIMS-256. All of the analog-to-digital converters 90 shown in the drawing are to be understood as the A/D converter of this analog memory input system.

In the following the control process will be described in detail with reference to FIGS. 1B and 1C. A digital computer 70 Interdata Computer manufactured by Interdata, Inc., Oceanport, N. J.) is used for the control process. The calculating and switching elements shown are part of a computer program unless otherwise indicated.

FIG. 1B shows the basic logic data flow of the control system. In this system element R200 calculates from a desired total air flow signal DTAS furnished from storage element T2422 C, from the actual air flow signals F230 and F228, and the process conditions signals, namely the signal for the control of the vent valve S229 and the setpoint signal for the blower setpoint SP228. The element SC, a portion of the computer program, converts the actual flow signals F228 of the blower air flow (downstream of the vent line) and F230, the spill air flow signal, to standard conditions by correcting for non-standard temperatures and pressures utilizing the spillover air temperature signal T237, the spillover pressure signal SPP, the relative humidity signal H201, the blower pressure signal P205, and the blower temperature signal T238, correspondingly. The two lines 150 and 152 represent the signals for the blower air flow downstream of the vent and the signal for the vent air, both converted to standard conditions. The sum of the signals in lines 150 and 152 represents the actual air flow to the regenerator under standard conditions or the signal MAFS.

The logic element R200 converts the desired total air flow signal DTAS and the main air flow signal MAFS into a side air control signal SACS by the following subtraction:

$$SACS = MAFS - DTAS$$

Note that the side air control signal SACS is the signal representing the air that has to be removed from the actually flowing air in order to reach the desired air flow. Therefore, the side air control signal SACS can be directly utilized for operating the vent valve 28. Since the actual control of the vent is done under operating conditions and the side air control signal is a signal representative of standard conditions, this side air control signal SACS is converted to operating conditions by element FC utilizing the temperature, pressure and humidity value shown in the drawing and listed above for their meanings.

The side air control signal recorrected for operation conditions is then passed via line 156 and a digital-to-analog converter 96 by AO-32 Model 315, manufactured by Applied Automation, Inc., Pawhuska Road, Bartlesville, Oklahoma, to the I/P converter 82 described in connection with FIG. 1A. The electrical analog signal is a signal in the range of 4 to 20 milliamperes. The I/P converter is a commercially obtained unit Taylor Instruments, Model 701TS-112. This I/P converter 82 operates a vent valve 28 in the normal sense that an increase of signal S229 results in a further opening of the valve 28 and vice versa.

The element R200 also furnishes the control signal SP228 for the blower. The logical element R200 symbolizes the steps of the computer program shown in FIG. 1C from box 108 on downstream. The control signal SP228 for the blower is a constant and is only changed if the side air control signal exceeds one of its limits and if a time condition is fulfilled as will be explained. The computer program shown in FIG. 1C as a logical flow sheet is triggered by a main clock or an executive program as indicated by arrow 103. The control cycle programmed in FIG. 1C is periodically operated after a constant time increment. This time increment in the present example is 4 seconds. The program starts by calculating the temperature difference between the temperature of the flue gas T242 and the temperature of the regenerator dense phase bed T240. This step is symbolized by box 100 in FIGS. 1B and 1C. Thereafter, this temperature difference is compared to a setpoint obtained from setpoint storage means T2422 SP, which is turn can be a manually set setpoint or can be a setpoint forwarded from other computer calculations.

From the actual temperature difference and the setpoint, the PI controller 102 calculates a desired total air flow signal F2000S and transmits the value to storage means T2422C. The PI controller is a program subroutine with a proportional section and an integral section. This subroutine is described in more detail in the brochure AAI Optrol D-II, Process Computer System Software Manual, Section 5-D.1-1, by Applied Automation, Inc., Bartlesville, Oklahoma. The PI controller is a simplified PID controller. The PID controller, the subroutine of which is described in the quoted brochure, is based on the following equation:

$$\phi V = KN[KP(M - SP) + KI \int_0^t (M - SP)dt + \frac{KD}{TL} \frac{d(M - SP)}{dt}]$$

wherein $\phi V$ = output value of controller (F2000S).
M = measured variable ($\Delta T$).
SP = setpoint for the variable (T2422SP).
KN = normalization factor.
KP = proportional gain (K2422KP or K2422KP×X2422KP).
KI = integral gain (K2422KI or K2422KI×X2422KI).
KD = derivative gain.
TL = derivative time lag.
t = time for differentiation or, respective, integration.

The actual PID equation used by the digital computer consists of several equations and operates on a discrete time basis with sampled data. In case of the P/I controller KD is zero. The inputs and outputs in the schematic FIG. 1B are shown in parenthesis above behind the definitions.

For a more accurate control, the two constants for the P/I controller, namely the proportional constant and the integral constant that are furnished from the storage elements K2422KP and K2422KI, can be replaced by an adaptive tuning represented by the logic or subroutine 142. This adaptive tuning is switched on or off by switch means X2422T. The adaptive tuning itself calculates from the flue gas temperature signal T242 in a subroutine a value X2422KP which is in the order of magnitude of 1. The value X2422KP is related to the flue gas temperature T242 in degrees Fahrenheit by the equation $$X2422KP = 1/43.73*(-42.2 + (0.0716*T242)); X2422\text{-}KI = 1.0;$$

These equations were empirically derived from actual tests run on the regenerator and are specific to this regenerator. This value X2422KP is then multiplied by the proportional constant K2422KP in multiplication means 144. The adaptive tuning compensates for the fact that the regeneration air demanded is not solely (although primarily) dependent upon the temperature difference between the flue gas temperature and the regenerator bed temperature, but also to a certain extent dependent upon the absolute values of these temperatures. However, since this adaptive tuning is not an essential element of the invention but only a refinement, a detailed description of the adaptive tuning subroutine is omitted here.

A typical example for the relationship of the temperature difference and the deviation thereof in relationship to the change of air flow for a commercially operated catalyst regenerator system is given in the following:

| Total quantity of catalyst | 190 tons |
|---|---|
| Circulation rate of catalyst | 21 tons per minute |
| Hydrocarbon feed flow | 2000 bbl per hour |
| Regenerator bed temperature | 1250° F. |
| Flue gas temperature | 1275° F. |
| Regenerator temperature difference setpoint | 15° F. |
| Deviation of temperature difference from setpoint | +10° F. |
| Correctional air demand (desired total air flow at 0° F. deviation minus desired total air flow at 10° F. deviation) | +500 SCFM |

Box 108 in the logical flow sheet of FIG. 1C, which is a part of the logical element R200, calculates from the desired total air flow signal a side air control signal by subtracting the desired total air flow signal from the actual air flowing into the regenerator corrected to normal conditions. The result is the amount of air under normal conditions by which the total air has to be reduced to reach the desired value. Note that this reversing in the subtraction is done in order to have a signal that is directly useful for the operating of the vent valve. In the second embodiment shown in FIGS. 2A, B and C where a plant air stream instead of a vent stream is used as a side air line, calculation is reversed (see in particular FIG. 2C).

The next program step is incrementing the clock by one increment in box 106. This clock is an electronic unit within the computer that subtracts an increment from a set value and delivers a 0 or 1 information to the information switch 110 when a number of increments corresponding to less than 3 minutes has been subtracted. For a 4-second control cycle, this means that switch 110 is in "yes" position for 44 cycles and switches to the "no" position at the 45th cycle after a change in lower RPM setpoint.

For 3 minutes since the last RPM adjustment has passed, the blower RPM setpoint is not changed and the original value is transmitted to the RPM controller 60 (box 112) and the vent air signal as calculated is transmitted to the I/P converter 82 (box 114) for the regular control. After 3 minutes have passed, indicated by the switch 110 being in "no" position, the control program goes through further check switches. First the switch 116, the actual blower RPM represented by signal S228 (see FIGS. 1A and 1B) is compared to the blower RPM limits. If the actual RPM of the blower is outside of the limits, the blower RPM setpoint is adjusted (box 118) to bring the blower back into the range. If the RPM is within the limits, the vent signal is compared with the upper limit of the vent signal in switch element 120. If the vent signal is above the upper limit, 47 RPM are subtracted from the blower RPM setpoint in box 122. The 47 RPM in this specific example represent the quantity of blower air that is equal to ½ of the total air that can be vented by valve 28. If the vent air signal is below the high limit, that is, when switch 120 shows "no", the last switch element 124 determines whether the vent air signal is below the lower limit of the vent air control. If this is the case, switch 124 shows "yes" and 47 RPM are added to the blower setpoint in box 126. Otherwise, i.e., if the vent signal is above the lower limit and switch 124 correspondingly shows "no", the normal program represented by boxes 112 and 114 continues by transmitting the respective control signals obtained to the controllers. After all three possible adjustments of the blower RPM setpoint by boxes 118, 122 and 126 have been made, the clock is reset to the starting position by box 128. Thereafter the normal program continues with the two transmitting steps symbolized by box 112 and 114 as explained above.

Cracker-Regenerator (FIGS. 2A, B and C)

The second embodiment of this invention is similar in many respects to the first one. The main difference resides in the fact that the side air line is not a vent line but a plant air source line 27 controlled by a valve 29. The regenerator/cracker units 1 and 2 are shown in somewhat more detail in this FIG. 2A. The catalyst is steam-stripped in a baffled section 16 of this unit. The steam for this stripping is introduced via line 18. The total air introduced into the regenerator is split into two lines, 7 and 7', respectively, feeding two separate concentric rings 8 and 8' in the regenerator. The distribution of the total air between the rings 8 and 8' is controlled separately by means not shown in the drawing. The hydrocarbon feed stream to be cracked is introduced by way of line 9 into the main vessel. The feedstock entrains regenerated catalyst into the riser pipe 4 and cracked feedstock leaves the main vessel via line 5.

The control manipulation of the blower and the plant air stream in this embodiment also differ somewhat from the control manipulation of the embodiment shown in FIGS. 1A, B and C. The control system delivers by means of a digital computer a side air control signal PAS, which is representative of the plant air to be added to the blower air via line 27, valve 29 and lines 31, 31' and 31''. This plant air setpoint signal PAS is converted by I/P converter to an air signal which is the setpoint of an air plant air flow controller 86 with two inputs and one output. The actual flow in line 27 is determined by flow meter 84 and transmitted as an air signal to the plant air flow controller 86 and a digital signal F431 to the computer. The plant air flow controller actuates the valve 29 responsive to the difference at the two inputs. The pressure in the plant air line 27 is measured and transformed into a digital signal P406.

The computer also furnishes a blower control signal BCS, which is converted in an I/P converter 65 to an air setpoint for the air blower air controller 61. This blower air controller 61 generates an air control signal responsive to the difference between the setpoint and the actual flow of the blower air, which is measured at 59 and converted to an air signal for a second input of the blower air controller. Simultaneously, the measured value for the blower air flow is converted to a digital signal F430. The blower air controller controls a governor 74, which is an RPM controller. This governor is the commercially obtainable Woodward-Governor. The governor 74 mechanically operates valve 42 in the stream line 40 supplying steam to turbine 22, which turns the blower 20. The governor 74 operates this valve 42 responsive to the actual RPM of the turbine, which value is transmitted to the governor via line 76. The digital signal S401 is generated in the unit 97 responsive to a pulse signal as described above. Temperature and pressure of the blower air are measured and converted to digital signals T424 and P404, respectively. Ambient temperature and pressure are also measured and transformed into digital signals T237 and P207, respectively. This is symbolically indicated in FIG. 2A.

The actually employed units such as thermocouples, venturi flow meters and orifice flow meters, etc., are the same as those used and explained in connection with FIGS. 1A, B and C. Also the analog-to-digital converter 90 is the converter of the analog memory input system described above.

Control System (FIGS. 2B and C)

The control system as such of this embodiment is very similar to that shown in FIGS. 1B and 1C. The calculating means TRC4312PID calculates a total desired air flow signal F4000S which is stored in storage means T4312CO. This signal is used as signal DTAS by logic element R400. The computation of F4000S is essentially the same as explained in connection with FIG. 1B. The calculating means TRC4312 in this embodiment is a PID controller that utilizes also the differential gain input K4312KD. The basic equation for this PID controller has been shown above. M corresponds to T4313, SP corresponds to ΔT SET POINT, KP corresponds to K4312KP, or respectively, K4312KP * X4312KP, KI corresponds to K4312KI, or respectively, K4312KI * X4312KI. Details concerning this PID controller are also explained in the same brochure Optrol D-II, Process Computer System Software Manual, Sect. 5-D.1-1 by Applied Automation, Inc., Bartlesville, Oklahoma. A switch X4312T is provided for to operate the control system with or without the adaptive tuning.

The adaptive tuning for this second example is again based on empirically derived equations that are specific to this regenerator/cracker system. The adaptive tuning module 142 thus calculates from the regenerator bed temperature T427 and the flue gas temperature T431 both in degree Fahrenheit values X4312KP and X4312KI in accordance with the following equations $$X4312KP = 1/55.65(67.4 - 0.783*(T431 - T427))$$

$$X4312KI = 1.0$$

The reason the value X4312KI (and in case of FIG. 1B X2422KI) are used although these values do not change and thus are not "adaptive" is that originally it was believed that a tuning of the integral gain would be advantageous but it was found that the deviation from the untuned integral gain was so small that it was not worth the effort to incorporate an adaptive tuning for the integral gain.

Calculating element SC converts the flow signals F430 (blower air flow) and F431 (plant air flow) to flow signals under standard conditions. To do this the signals for the relative humidity R001, ambient temperature T237, plant air pressure P406, atmospheric pressure P207, blower air pressure P404, and blower air temperature T424 are being used. Correspondingly, the calculating element FC converts the computed setpoint signals back to flow conditions so that the actual control signals BCS for the blower setpoint and PAS for the plant air setpoint are signals for flow conditions.

Figure 2C:
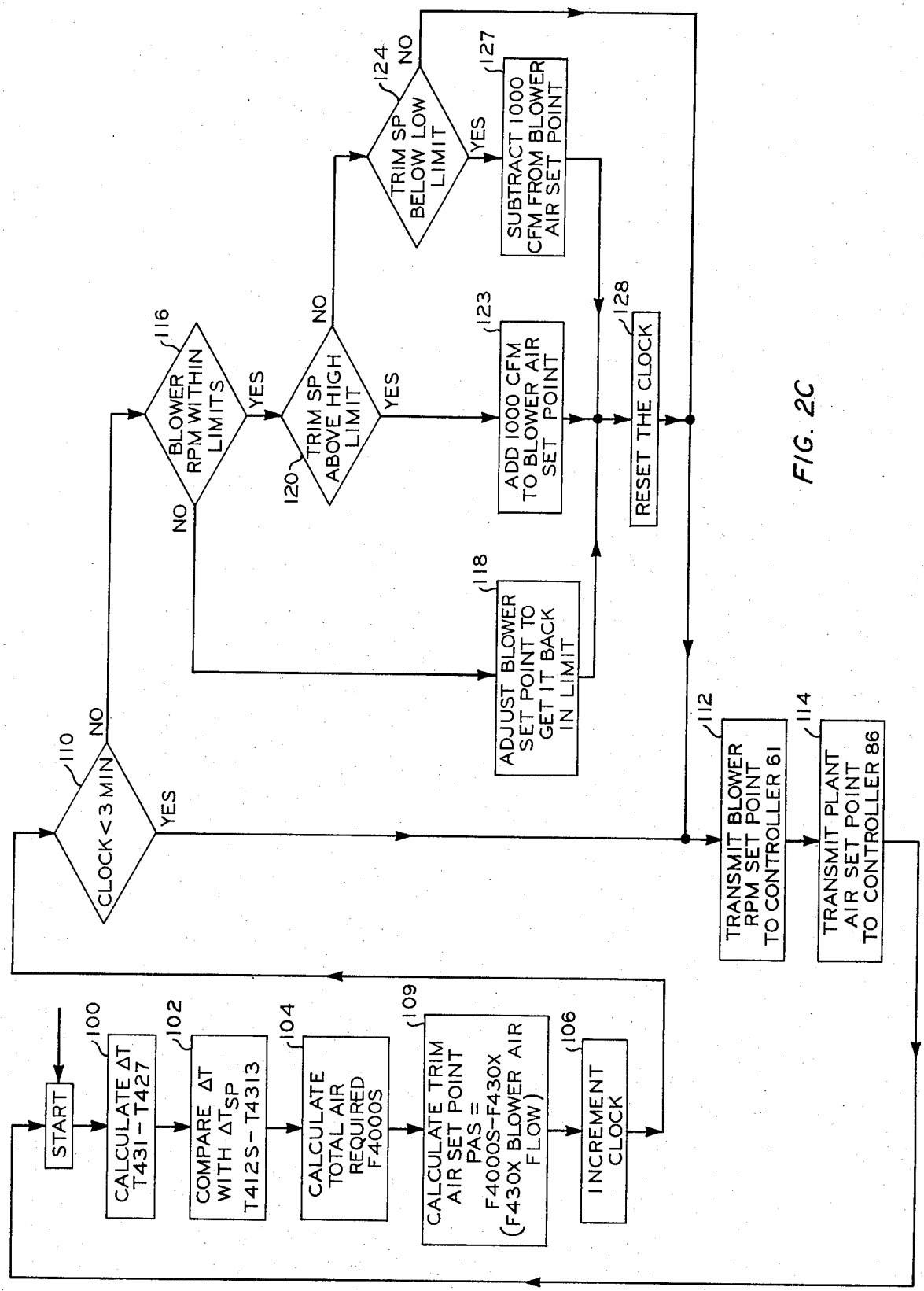

The logic element R400 carries out all the steps of the program shown in FIG. 2C from box 109 on downstream. First the trim air setpoint (required plant air) is calculated by subtracting the actual blower air flow (standard conditions) from the desired total air flow (standard conditions). Then the clock is incremented, which corresponds to a time interval of 4 seconds, because the program of FIG. 2C is repeated every 4 seconds. The clock check in switch element 110, the blower RPM check in switch element 116, and the trim air checks in 120 and 124 are the same as explained in connection with FIG. 1C. In the present case, the trim air control limits are being used for the comparison. Whereas in FIG. 1C the blower speed was increased if the side air signal (vent) was below the low limit, here the blower set point is decreased by 1,000 CFM if the side air signal (trim air) is below the low limit. Correspondingly, the blower setpoint is increased by 1,000 CFM if the side air signal is above the high limit. The maximum volume of plant air that can be added to the blower air from the plant air source is 2,000 CFM. Otherwise the two programs in FIGS. 1C and 2C are identical. Ultimately the computer delivers blower air control signals and/or a trim air control signal, which after conversion into an analog electrical signal under flow conditions adjust the respective flows.

The blower is only adjusted if at least 3 minutes have passed since the blower has been adjusted for the last time. That means that at least 44 control cycles as shown in FIG. 2C are being carried out for an adjustment in either one of the boxes 118, 123 or 127 is being carried out.

Reasonable variations and modifications which will become apparent to those skilled in the art can be made in this invention without departing from the spirit and scope thereof.

I claim:

1. In a method for regenerating a coke-deactivated cracking catalyst by burning off said coke from said deactivated cracking catalyst with air in a catalyst regeneration zone
   the improvement which comprises
   A. controlling the flow of said air into said regeneration zone in a main air line into the regeneration zone and in a side air line, said side air line being in fluid communication with said main air line or said regeneration zone,
   B. controlling the flow of air in said side air line within a side air control range responsive to the actual flow of air into the regeneration zone and to a desired total air flow signal established responsive to temperature conditions in the regeneration zone,
   C. controlling the flow of air in the main air line at a normally constant value, said normally constant value being adjusted to a new normally constant value responsive to the control of the side air line whenever
      a. the flow of air in said side air line exceeds said side air control range and
      b. at least a set minimal time has elapsed since the last change of said normally constant value.

2. In a method for regenerating a coke-deactivated cracking catalyst by burning off said coke from said deactivated cracking catalyst with air in a catalyst regeneration zone, the improvement comprising:
   a. injecting air by means of a blower through a main air line into contact with said cracking catalyst in said regeneration zone,
   b. conducting side air through a side air line, said side air line being in fluid communication with said blower and said regeneration zone,
   c. withdrawing flue gas from said regeneration zone,
   d. automatically generating a desired total air flow signal DTAS responsive to at least one temperature measurement in said regeneration zone,
   e. automatically generating a blower air control signal BACS having a normally constant value, said value being set either at the beginning of the process to a desired value or by a previous control cycle, f. passing said blower air control signal BACS to a blower air controller that controls the speed of said blower responsive to said blower air control signal, g. automatically measuring the flow of air in said main air line feeding into the regeneration zone into which main air line said blower feeds air and establishing a main air flow signal MAFS responsive to said measurement, h. automatically establishing a side air line control signal SACS from said desired total air flow signal DTAS and said main air flow signal MAFS in accordance with the relationship $\pm$SACS=DTAS−MAFS, i. passing said side air line control signal to a side air line controller, having a side air line control signal range within two set limits, that controls the flow of said side air through said side air line responsive to said side air line control signal, j. automatically establishing a time signal containing the information whether or not an elapsed time is shorter than a fixed minimal elapsed time in the range of about 30 to about 500 seconds, said elapsed time being defined as the time that has elapsed since the setting of the normally constant value for the blower air control signal BACS presently used, and k. automatically selectively performing one of a plurality of steps responsive to the side air line control signal SACS and the time signal, said alternately selectively performable steps consisting of:

aa. when the side air line control signal is between the two set limits in the side air line control signal range of the side air line controller, repeating steps d through k, bb. when the side air line control signal exceeds one of the two set limits in the side air line control signal range of the side air line controller and when said time signal indicates the elapsed time to be shorter than the fixed minimal elapsed time, repeating steps d through k, and cc. when the side air line control signal exceeds one of the two set limits in the side air line control signal range of the side air line controller and when said time signal indicates the elapsed time not to be shorter than the fixed minimal elapsed time, automatically changing the normally constant value of said blower air control signal BACS to a new normally constant value by an increment representative of a quantity of air that is smaller than the quantity of air that can be controlled by said side air line controller and repeating steps d through k with the new normally constant value being employed as the normally constant value in step e.

3. A process in accordance with claim 2 wherein said time signal is established by automatically starting a clock whenever said normally constant value for the blower air control signal BACS is changed for a corresponding change of the blower air controller and wherein said clock delivers said time signal.

4. A process in accordance with claim 3 wherein said clock automatically delivers a pulse signal whenever said clock has run for said minimal elapsed time and wherein said pulse signal is stored in a storage unit from where this stored signal is automatically withdrawn and used in step k, and wherein said stored pulse is erased after said constant value for the blower air control signal has been changed.

5. A process in accordance with claim 2 wherein said side air line is a valve-controlled trim air flow line and wherein said normally constant value is changed in step k, cc, such as to increase and, alternately, decrease the blower air flow when the side air line control signal exceeds a control limit representative of the upper and, alternately, lower trim air flow of the side air control signal range.

6. A process in accordance with claim 2 wherein said side air line is a valve-controlled vent air line from the main air line and wherein said normally constant value is changed in step k, cc, such as to decrease and, alternately, increase the blower air flow when the side air line control signal exceeds a control limit representative of the upper and, alternately, lower vent air flow of the side air line control signal range.

7. A process in accordance with claim 2 wherein said air blower is driven by a steam turbine, wherein steam flow into said steam turbine is controlled by a steam valve, wherein said steam valve in turn is controlled by an RPM controller to which an RPM signal, corresponding to the actual RPM of the turbine, and an RPM setpoint signal are passed, the latter corresponding to the blower air control signal BACS and having said normally constant value.

8. A process in accordance with claim 2 wherein said increment is such as to change the blower air provided by about ½ of the total amount of air that can be controlled by said side air line controller.

9. A process in accordance with claim 2 wherein said main air flow signal is an electrical signal, wherein said main air flow signal is freed of noise before its use for establishing the side air line control signal.

10. A process in accordance with claim 9 wherein said flow of air generated by said blower is measured and converted into an analog electrical blower air flow signal, wherein this analog electrical blower air flow signal is passed through a filter to remove all components having a frequency of above about one Hz and wherein this filtered main air flow signal is further used for the computation of the side air line control signal.

11. A process in accordance with claim 2 wherein said regeneration zone includes a dense phase regenerator bed and the temperature of the dense phase regenerator bed is measured and, correspondingly, a regenerator bed temperature signal is established, wherein the temperature of the flue gas leaving the regeneration zone is measured and, correspondingly, a flue gas temperature signal is established, wherein a temperature difference signal corresponding to the difference between the flue gas temperature and the regenerator bed temperature is established from the regenerator bed temperature signal and the flue gas temperature signal, and wherein this temperature difference signal is compared to a setpoint temperature difference signal to establish a temperature deviation signal, and wherein this temperature deviation signal is converted to said desired total air flow signal DTAS.

12. A process in accordance with claim 2 wherein said main air flow signal is automatically corrected from actually employed temperature, pressure and humidity conditions to normal conditions, wherein said desired total air flow signal is automatically established as a signal corrected for deviations from normal conditions, and wherein the side air line control signal computed is automatically recorrected to actually prevailing operating conditions.

* * * * *

UNITED STATES PATENT AND TRADEMARK OFFICE
CERTIFICATE OF CORRECTION

PATENT NO. : 4,217,243

DATED : August 12, 1980

INVENTOR(S) : David A. Christie

It is certified that error appears in the above-identified patent and that said Letters Patent are hereby corrected as shown below:

Column 12, line 37, claim 1, after "actual" and before "flow" the word "total" has been omitted.

Column 14, line 7, claim 5, after "air" and before "control" the word "line" has been omitted.

Signed and Sealed this

Tenth Day of March 1981

[SEAL]

Attest:

RENE D. TEGTMEYER

Attesting Officer     Acting Commissioner of Patents and Trademarks